United States Patent
Amada et al.

(10) Patent No.: US 8,467,461 B2
(45) Date of Patent: Jun. 18, 2013

(54) DATA TRANSFER SYSTEM

(75) Inventors: Hideyuki Amada, Kawasaki (JP); Tetsuo Ashizawa, Kawasaki (JP); Hideo Akiyoshi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 509 days.

(21) Appl. No.: 12/558,298

(22) Filed: Sep. 11, 2009

(65) Prior Publication Data

US 2010/0002778 A1   Jan. 7, 2010

Related U.S. Application Data

(63) Continuation of application No. PCT/JP2007/055414, filed on Mar. 16, 2007.

(51) Int. Cl.
*H04L 27/00* (2006.01)
(52) U.S. Cl.
USPC ............. 375/259; 375/257; 375/281; 341/50; 329/300
(58) Field of Classification Search
USPC .......................................... 375/257
See application file for complete search history.

(56) References Cited

U.S. PATENT DOCUMENTS

| | | | | |
|---|---|---|---|---|
| 3,838,414 A | * | 9/1974 | Wiles | 341/147 |
| 4,639,897 A | * | 1/1987 | Wacyk | 365/200 |
| 5,430,739 A | * | 7/1995 | Wei et al. | 714/784 |
| 6,339,622 B1 | | 1/2002 | Kim | |
| 7,170,431 B2 | * | 1/2007 | Jung et al. | 341/50 |

FOREIGN PATENT DOCUMENTS

| | | |
|---|---|---|
| JP | 7-182253 A | 7/1995 |
| JP | 08-314589 A | 11/1996 |
| JP | 11-177639 A | 7/1999 |
| JP | 2000-252830 A | 9/2000 |
| JP | 2001-305510 A | 10/2001 |
| JP | 2002-323944 A | 11/2002 |

\* cited by examiner

*Primary Examiner* — Lihong Yu
(74) *Attorney, Agent, or Firm* — Arent Fox LLP

(57) ABSTRACT

$2^n$ data transfer signal lines are provided between transmitting and receiving sides of data on n signal lines in order to reduce power consumption required for a data transfer even if the number of bits of data to be transferred increases. The transmitting side has an encoder for outputting a signal of a low potential to one signal line and a signal of a high potential to the other signal lines among the $2^n$ data transfer signal lines in response to an input of transfer data from the n signal lines. The receiving side has a decoder for outputting the similar data as the transfer data to n signal lines in response to inputs from the $2^n$ data transfer signal lines.

4 Claims, 19 Drawing Sheets

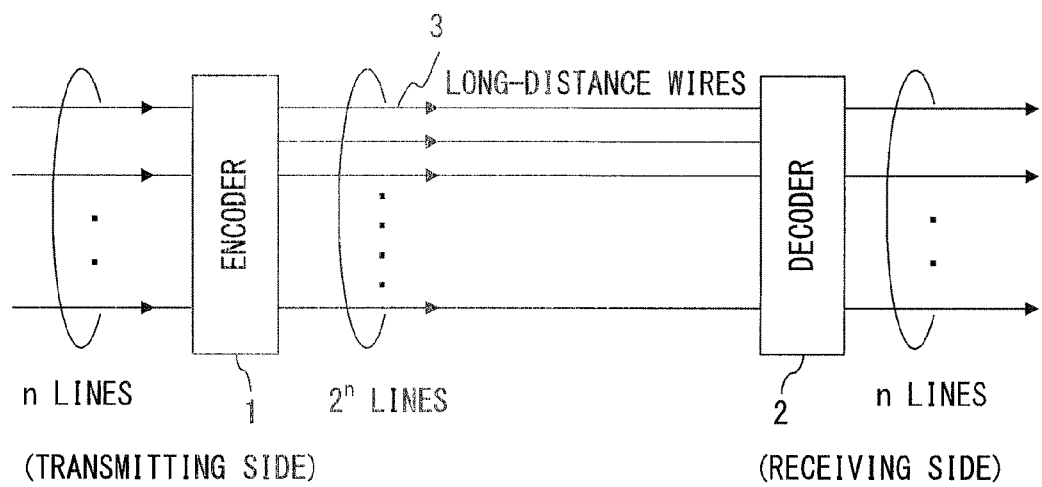
F I G. 2 A

| INPUT TO 2-INPUT NAND | | | | OUTPUT |
|---|---|---|---|---|
| Ax[0] | – | Ax[1] | – | B[0] |
| – | A[0] | Ax[1] | – | B[1] |
| Ax[0] | – | – | A[1] | B[2] |
| – | A[0] | – | A[1] | B[3] |

F I G. 4

| INPUT TO 2-INPUT NAND | | | | OUTPUT |
|---|---|---|---|---|
| B[0] | – | B[2] | – | Cx[0] |
| – | B[1] | – | B[3] | C[0] |
| B[0] | B[1] | – | – | Cx[1] |
| – | – | B[2] | B[3] | C[1] |

FIG. 5

|      | 0 | 1 | 2 | 3 |
|------|---|---|---|---|
| A[0] | 0 | 1 | 0 | 1 |
| A[1] | 0 | 0 | 1 | 1 |
| B[0] | 0 | 1 | 1 | 1 |
| B[1] | 1 | 0 | 1 | 1 |
| B[2] | 1 | 1 | 0 | 1 |
| B[3] | 1 | 1 | 1 | 0 |
| C[0] | 0 | 1 | 0 | 1 |
| C[1] | 0 | 0 | 1 | 1 |

FIG. 6

|  | NUMBER OF SIGNAL LINES | POWER CONSUMPTION ||
| --- | --- | --- | --- |
|  |  | CONVENTIONAL TECHNOLOGY | FIRST EMBODIMENT |
| 2 BITS | 4 | 0.5 | 0.75 |
| 3 BITS | 8 | 0.75 | 0.88 |
| 4 BITS | 16 | 1 | 0.94 |
| 5 BITS | 32 | 1.25 | 0.97 |
| 6 BITS | 64 | 1.5 | 0.98 |

F I G. 7

| INPUT TO 3-INPUT NAND | | | | | | OUTPUT |
|---|---|---|---|---|---|---|
| Ax[0] | – | Ax[1] | – | Ax[2] | – | B[0] |
| – | A[0] | Ax[1] | – | Ax[2] | – | B[1] |
| Ax[0] | – | – | A[1] | Ax[2] | – | B[2] |
| – | A[0] | – | A[1] | Ax[2] | – | B[3] |
| Ax[0] | – | Ax[1] | – | – | A[2] | B[4] |
| – | A[0] | Ax[1] | – | – | A[2] | B[5] |
| Ax[0] | – | – | A[1] | – | A[2] | B[6] |
| – | A[0] | – | A[1] | – | A[2] | B[7] |

F I G. 9

| INPUT TO 4-INPUT NAND | | | | | | | | OUTPUT |
|---|---|---|---|---|---|---|---|---|
| B[0] | – | B[2] | – | B[4] | – | B[6] | – | Cx[0] |
| – | B[1] | – | B[3] | – | B[5] | – | B[7] | C[0] |
| B[0] | B[1] | – | – | B[4] | B[5] | – | – | Cx[1] |
| – | – | B[2] | B[3] | – | – | B[6] | B[7] | C[1] |
| B[0] | B[1] | B[2] | B[3] | – | – | – | – | Cx[2] |
| – | – | – | – | B[4] | B[5] | B[6] | B[7] | C[2] |

FIG. 10

| INPUT TO 4-INPUT NAND | | | | | | | | OUTPUT |
|---|---|---|---|---|---|---|---|---|
| Ax[0] | – | Ax[1] | – | Ax[2] | – | Ax[3] | – | B[0] |
| – | A[0] | Ax[1] | – | Ax[2] | – | Ax[3] | – | B[1] |
| Ax[0] | – | – | A[1] | Ax[2] | – | Ax[3] | – | B[2] |
| – | A[0] | – | A[1] | Ax[2] | – | Ax[3] | – | B[3] |
| Ax[0] | – | Ax[1] | – | – | A[2] | Ax[3] | – | B[4] |
| – | A[0] | Ax[1] | – | – | A[2] | Ax[3] | – | B[5] |
| Ax[0] | – | – | A[1] | – | A[2] | Ax[3] | – | B[6] |
| – | A[0] | – | A[1] | – | A[2] | Ax[3] | – | B[7] |
| Ax[0] | – | Ax[1] | – | Ax[2] | – | – | A[3] | B[8] |
| – | A[0] | Ax[1] | – | Ax[2] | – | – | A[3] | B[9] |
| Ax[0] | – | – | A[1] | Ax[2] | – | – | A[3] | B[10] |
| – | A[0] | – | A[1] | Ax[2] | – | – | A[3] | B[11] |
| Ax[0] | – | Ax[1] | – | – | A[2] | – | A[3] | B[12] |
| – | A[0] | Ax[1] | – | – | A[2] | – | A[3] | B[13] |
| Ax[0] | – | – | A[1] | – | A[2] | – | A[3] | B[14] |
| – | A[0] | – | A[1] | – | A[2] | – | A[3] | B[15] |

FIG. 12

| | INPUT TO 8-INPUT NAND | | | | | | | | | | | | | | | | OUTPUT |
|---|---|---|---|---|---|---|---|---|---|---|---|---|---|---|---|---|---|
| | B[0] | B[1] | B[2] | B[3] | B[4] | B[5] | B[6] | B[7] | B[8] | B[9] | B[10] | B[11] | B[12] | B[13] | B[14] | B[15] | |
| | – | B[1] | – | B[3] | – | B[5] | – | B[7] | – | B[9] | – | B[11] | – | B[13] | – | B[15] | Cx[0] |
| | B[0] | – | B[2] | – | B[4] | – | B[6] | – | B[8] | – | B[10] | – | B[12] | – | B[14] | – | C[0] |
| | – | – | B[2] | B[3] | – | – | B[6] | B[7] | – | – | B[10] | B[11] | – | – | B[14] | B[15] | Cx[1] |
| | B[0] | B[1] | – | – | B[4] | B[5] | – | – | B[8] | B[9] | – | – | B[12] | B[13] | – | – | C[1] |
| | – | – | – | – | B[4] | B[5] | B[6] | B[7] | – | – | – | – | B[12] | B[13] | B[14] | B[15] | Cx[2] |
| | B[0] | B[1] | B[2] | B[3] | – | – | – | – | B[8] | B[9] | B[10] | B[11] | – | – | – | – | C[2] |
| | – | – | – | – | – | – | – | – | B[8] | B[9] | B[10] | B[11] | B[12] | B[13] | B[14] | B[15] | Cx[3] |
| | B[0] | B[1] | B[2] | B[3] | B[4] | B[5] | B[6] | B[7] | – | – | – | – | – | – | – | – | C[3] |

FIG. 13

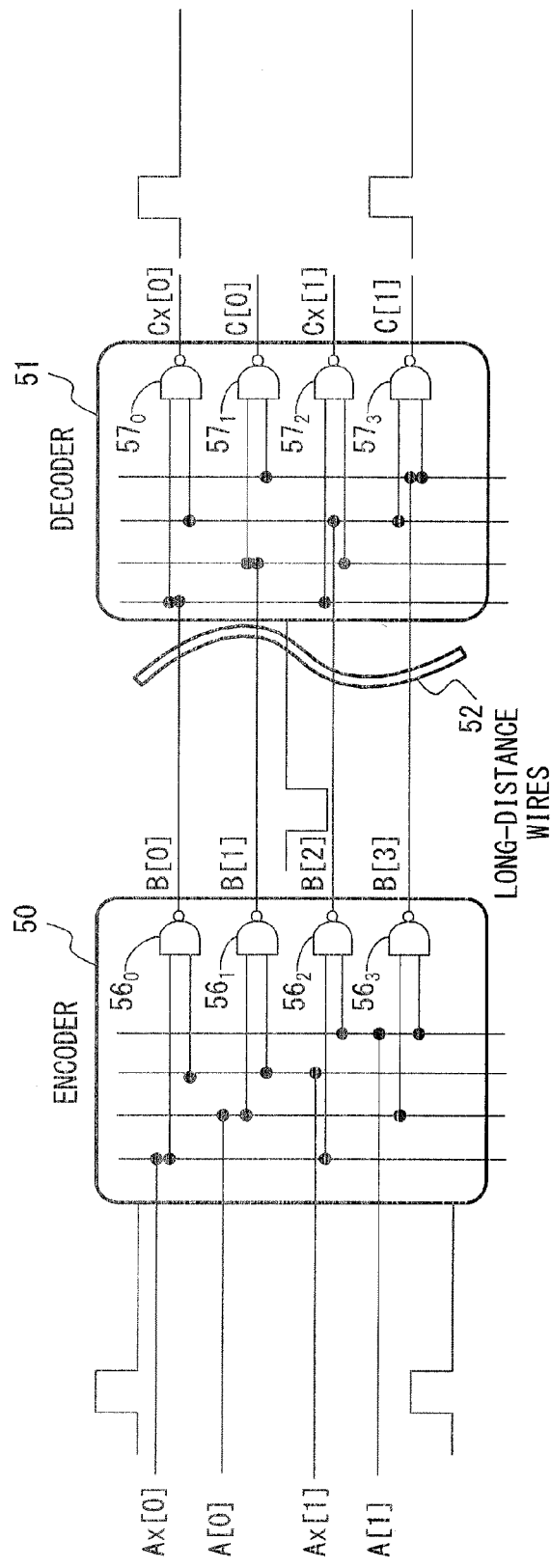
F I G. 14

|      | 0  | 1  | 2  | 3  |
|------|----|----|----|----|
| A[0] | 0  | P  | 0  | P  |
| A[1] | 0  | 0  | P  | P  |
| Ax[0]| P  | 0  | P  | 0  |
| Ax[1]| P  | P  | 0  | 0  |
| B[0] | NP | 1  | 1  | 1  |
| B[1] | 1  | NP | 1  | 1  |
| B[2] | 1  | 1  | NP | 1  |
| B[3] | 1  | 1  | 1  | NP |
| C[0] | 0  | P  | 0  | P  |
| C[1] | 0  | 0  | P  | P  |
| Cx[0]| P  | 0  | P  | 0  |
| Cx[1]| P  | P  | 0  | 0  |

(P: POSITIVE PULSE, NP: NEGATIVE PULSE)

FIG. 15

|  | NUMBER OF SIGNAL LINES | POWER CONSUMPTION ||
| --- | --- | --- | --- |
|  |  | CONVENTIONAL TECHNOLOGY | SECOND EMBODIMENT |
| 2 BITS | 4 | 2.0 | 1.0 |
| 3 BITS | 8 | 3.0 | 1.0 |
| 4 BITS | 16 | 4.0 | 1.0 |
| 5 BITS | 32 | 5.0 | 1.0 |
| 6 BITS | 64 | 6.0 | 1.0 |

FIG. 16

DATA TRANSFER SYSTEM

CROSS-REFERENCE TO RELATED APPLICATIONS

This application is a continuation of PCT application PCT/JP2007/055414, which was filed on Mar. 16, 2007, the entire contents of which are incorporated herein by reference.

FIELD

The present application relates to a data transfer system.

BACKGROUND

Reductions in power consumption in electronic devices such as a personal computer, an information processing device, etc. are an important issue at all times. Generally, in a semiconductor integrated circuit (LSI) used in such electronic devices, power consumption accompanying, for example, a data transfer on a relatively long-distance wire between the LSI and the outside of the LSI is high. For example, with a CMOS LSI, high power is consumed at the moment when the value of an output signal changes.

FIG. 1 is an explanatory view of an example of a conventional 2-bit data transfer system. In this conventional example, two long-distance wires are used to transfer 2-bit signals A[0] and A[1], transmission data output, for example, via inverters $100_0$ and $100_1$ are transferred by long-distance wires 101, and the data is output as 2-bit data C[0] and C[1] via inverters $102_0$ and $102_1$ on a receiving side. Such a conventional system has a problem that power consumption required for a data transfer increases with an increase in the number of bits of data, namely, a data bus width.

Patent Document 1 as a typical technique for reducing power consumption required for such a signal transfer discusses a signal transfer apparatus that reduces power consumption by inverting/non-inverting the polarity of original data to be transferred so as to decrease a temporal change in the data to be transferred, and by transferring the result of inverting/non-inverting the data to which polarity indication data indicating whether or not the data is inverted is added.

Patent Document 1: Japanese Laid-open Patent Publication No. 08-314589 "Signal Transfer Apparatus"

SUMMARY

According to an aspect of the embodiments, a data transfer system includes $2^n$ data transfer signal lines between a transmitting side having n transmission signal lines and a receiving side having n reception signal lines, wherein n-bit transmission data is transferred by the $2^n$ data transfer signal lines.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a block diagram illustrating a configuration of a data transfer system according to a first embodiment;

FIG. 4 is an explanatory view of inputs/outputs of NAND gates within an encoder illustrated in FIG. 3;

FIG. 5 is an explanatory view of data inputs/outputs of NAND gates within a decoder illustrated in FIG. 3;

FIG. 6 illustrates a truth table in the 2-bit data transfer system illustrated in FIG. 3;

FIG. 7 is an explanatory view of a power consumption reduction effect in the first embodiment;

FIG. 9 is an explanatory view of data inputs/outputs of NAND gates on a transmitting side illustrated in FIG. 8;

FIG. 10 is an explanatory view of data inputs/outputs of NAND gates on a receiving side illustrated in FIG. 8;

FIG. 12 is an explanatory view of data inputs/outputs of NAND gates on a transmitting side illustrated in FIG. 11;

FIG. 13 is an explanatory view of data inputs/outputs of NAND gates on a receiving side illustrated in FIG. 11;

FIG. 14 is a circuit diagram illustrating a configuration of a pulse data transfer system according to the second embodiment;

FIG. 15 illustrates a truth table in the data transfer system illustrated in FIG. 14;

FIG. 16 is an explanatory view of a power consumption reduction effect in the second embodiment;

DESCRIPTION OF EMBODIMENTS

Figure 1:
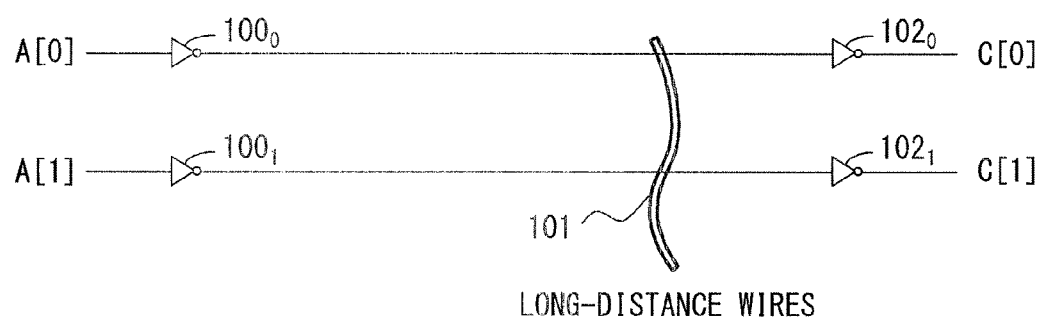
FIG. 1 is an explanatory view of a typical data transfer system.
Figure 2B:
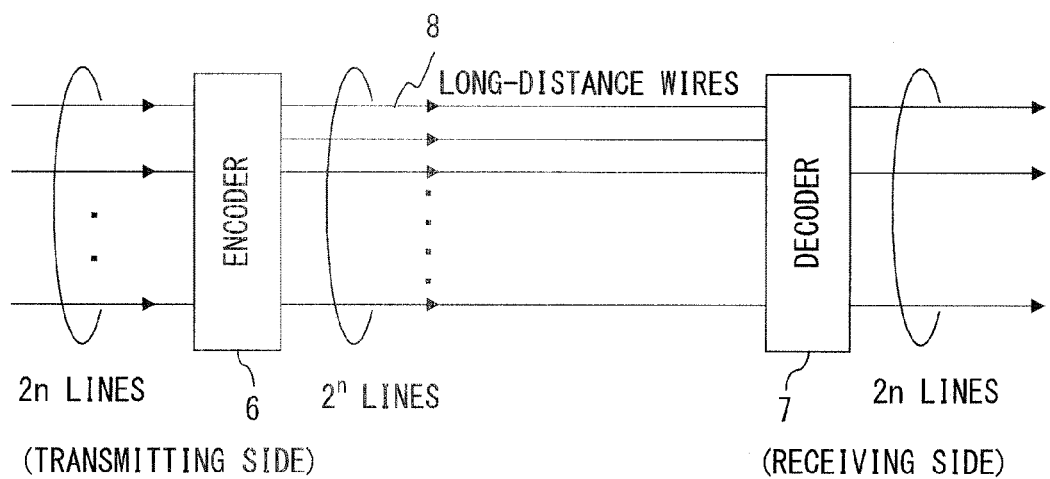
FIG. 2B is a block diagram illustrating a principle configuration of a data transfer system according to a second embodiment.

FIGS. 2A and 2B are block diagrams each illustrating a principle configuration of a data transfer system according to embodiment. FIG. 2A is a block diagram illustrating a principle configuration of a data transfer system according to a first embodiment to be described later, whereas FIG. 2B is a block diagram illustrating a principle configuration of a data transfer system according to a second embodiment.

In the data transfer system illustrated in FIG. 2A, a transmitting side has an encoder 1 for receiving data to be transferred as input signals from n signal lines and for providing outputs to long-distance wires 3 as $2^n$ data transfer signal lines between a receiving side and the transmitting side, and the receiving side has a decoder 2 for receiving the signals input from the long-distance wires 3 and for outputting the transfer data to n signal lines.

The encoder 1 outputs a signal of L to one signal line corresponding to data to be transferred among the $2^n$ long-distance wires 3 in response to an input of the data to be transferred and a signal of H to all the other signal lines. The decoder 2 outputs the similar data as the data on the transmitting side to the n signal lines in response to signal inputs from the long-distance wires 3.

In FIG. 2B, pulse data signals on 2n signal lines in pairs, which correspond to signals of n pairs, are transferred, and long-distance wires 8 are provided as $2^n$ data transfer signal lines between the transmitting side and the receiving side. Here, the signal lines in pairs are signal lines for complementary (differential) pulse data.

The data transmitting side has an encoder 6 for outputting a pulse having a potential that changes from high to low according to the pulse width of a positive pulse to one data transfer signal line corresponding to n signal lines, to which the positive pulses are provided, among the $2^n$ data transfer signal lines when the positive pulses are provided as pulses to be transferred to either of two complementary signal lines of the n pairs. In the meantime, the data receiving side has a decoder 7 for outputting a positive pulse to signal lines corresponding to the signal lines, to which the positive pulses are provided on the transmitting side, among 2n output signal lines in response to signal inputs from the $2^n$ signal lines.

Figure 3:
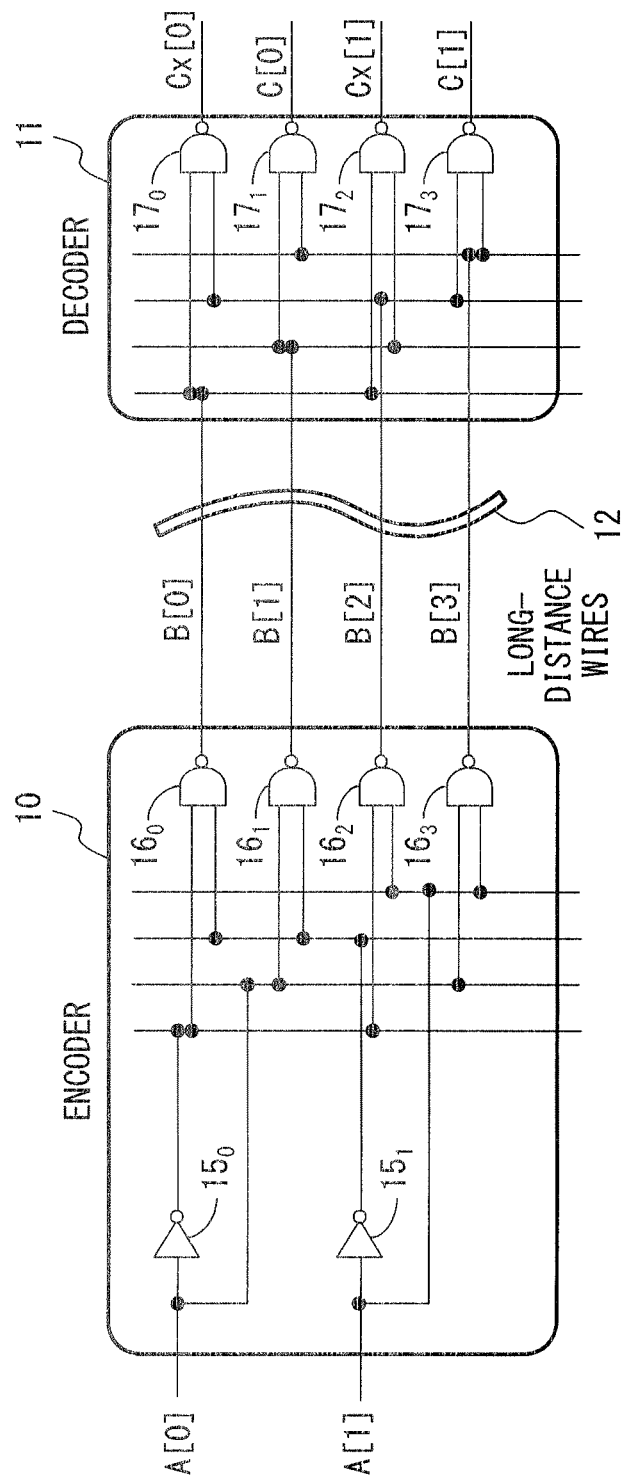
FIG. 3 is a circuit diagram illustrating a configuration of a 2-bit data transfer system according to the first embodiment.

FIG. 3 is a circuit diagram illustrating a configuration of a 2-bit data transfer system according to the first embodiment. Unlike a second embodiment to be described later, in which pulse data is transmitted from a transmitting side to a receiving side, the first embodiment assumes that data of a plurality of bits having a direct current value of "1", namely, H or "0", namely, L is transmitted from the transmitting side to the receiving side. According to embodiment, data on the n signal lines are transmitted to the receiving side by using the $2^n$ data transfer signal lines such as long-distance wires. In principle, data on one signal line, namely, 1-bit data may be transferred by using two data transfer signal lines. However, from a practical viewpoint, the first embodiment is described by assuming that a signal of two bits or more is transmitted.

In FIG. 3, 2-bit data A[0] and A[1] are provided to an encoder 10 on the transmitting side, data of B[0] to B[3] corresponding to 4-bit data are output from the encoder 10, and the data are transmitted to the receiving side via the long-distance wires 12.

The data of B[0] to B[3] are provided to a decoder 11 on the receiving side as the data from the long-distance wires 12. Then, it is assumed that C[0] and C[1] respectively having the similar values as the data A[0] and A[1] transmitted from the transmitting side are output from the decoder 11, and inverted signals Cx[0] and Cx[1] that are obtained by inverting C[0] and C[1] are also output from the decoder 11. It may not be always necessary to output these inverted signals. However, they are effective, for example, in a case where the receiving side requires differential signals.

FIG. 4 illustrates a relationship between input and output signals of each of four NAND gates $16_0$ to $16_3$ in the encoder 1 that is illustrated in FIG. 3 and configured with the two inverters $15_0$ and $15_1$ and the four NAND gates $16_0$ to $16_3$. Initially, inverted signals Ax[0] and Ax[1] are output from the two inverters $15_0$ and $15_1$, and these inverted signals are provided to the four NAND gates $16_0$ to $16_3$ when needed.

The first row of FIG. 4 represents a relationship between input and output signals of the NAND gate $16_0$. Namely, Ax[0] and Ax[1] are provided as input signals, and B[0] is output as an output signal. The second to the fourth rows respectively represent a relationship between input and output signals of the NAND gates $16_1$ to $16_3$.

FIG. 5 illustrates a relationship between input and output signals of each of the four NAND gates $17_0$ to $17_3$, which configure the decoder 11 illustrated in FIG. 3. The first row represents a relationship between input and output signals of the NAND gate $17_0$. Namely, B[0] and B[2] are provided as input signals, and Cx[0] is output as an output signal. The second to the fourth rows respectively represent a relationship between input and output signals of the NAND gates $17_1$ to $17_3$.

FIG. 6 illustrates a truth table in the 2-bit data transfer system illustrated in FIG. 3. This figure illustrates the values of 2 bits of the input signals A[0] and A[1] respectively for the data of decimal numbers 0 to 3, the values of B[0] to B[3] as outputs of the encoder 10, and the values of C[0] and C[1], which are equal to the input signals A[0] and A[1] to the encoder 10 among the outputs of the decoder 11.

In FIG. 6, for the data of B[0] to B[3] transferred by the long-distance wires 12 are characterized in that one of the four values B[0] to B[3] is "0" and all the three other values are "1" respectively for the decimal numbers 0 to 3. The data of B[0] to B[3] are also characterized in that if even one of the values of 2 bits input to the encoder 10 changes, the above described one value (for example, the value of B[0] among the four values corresponding to the decimal number 0 in FIG. 6) always changes from "0" to "1", and any one of the remaining three values (B[1] to B[3]) changes from "1" to "0".

FIG. 7 is an explanatory view of a power consumption reduction effect in the first embodiment. This figure is an explanatory view of the power consumption reduction effect in the first embodiment where n-bit data is transferred by using not n signal lines as in the conventional technology but $2^n$ signal lines. For example, the number of signal lines required to transfer 2-bit data is four, and the number of signal lines required to transfer 6-bit data is 64.

Power consumption in the conventional technology is initially described with reference to FIG. 7. For example, the 1-bit signal A[0] changes as follows: the value of A[0] changes to "1" if it is originally "0", or changes to "0" if it is originally "1". Moreover, the value of A[0] remains unchanged as "0" or "1" if A[0] does not change. Considering an operational rate implemented at the time of an operation and a non-operation, the probability that the signal A[0] changes results in 0.25, which also covers the case where the value does not change.

Accordingly, power consumption required for 2-bit data results in 0.5 correspondingly to two signal lines based on the assumption that that power consumption required per bit is 0.25. Power consumption required in the case of n bits is represented by 0.25×n. Accordingly, power consumption required in the case of 6 bits is represented as 1.5.

In contrast, power consumption required in the case of 2 bits in the first embodiment is described with reference to FIG. 6. As illustrated in FIG. 6, if data of 1 bit or more changes in the 2-bit data of A[0] and A[1], one of the data B[0] to B[3] of the long-distance wires changes from "0" to "1", and another of the data changes from "1" to "0". At this time, both the probability that A[0] and A[1] change and the probability that they do not change are 0.5. Assuming that power consumption is obtained by "(total probability)−(probability that all bits of data A do not change)", power consumption is provided by the following equation in the case of 2 bits.

power consumption=1−(0.5)$^2$=0.75

Additionally, power consumption required for n-bit data is provided by the following equation.

power consumption=1−(0.5)$^n$

As described above, according to embodiment, the value of power consumption is considered to approach "1" with an increase in the number of bits n of data. As illustrated in FIG. 7, power consumption required for 4-bit data is 1.0 in the conventional technology, and the first embodiment may reduce power consumption required to transfer data of 4 bits or more.

Figure 8:
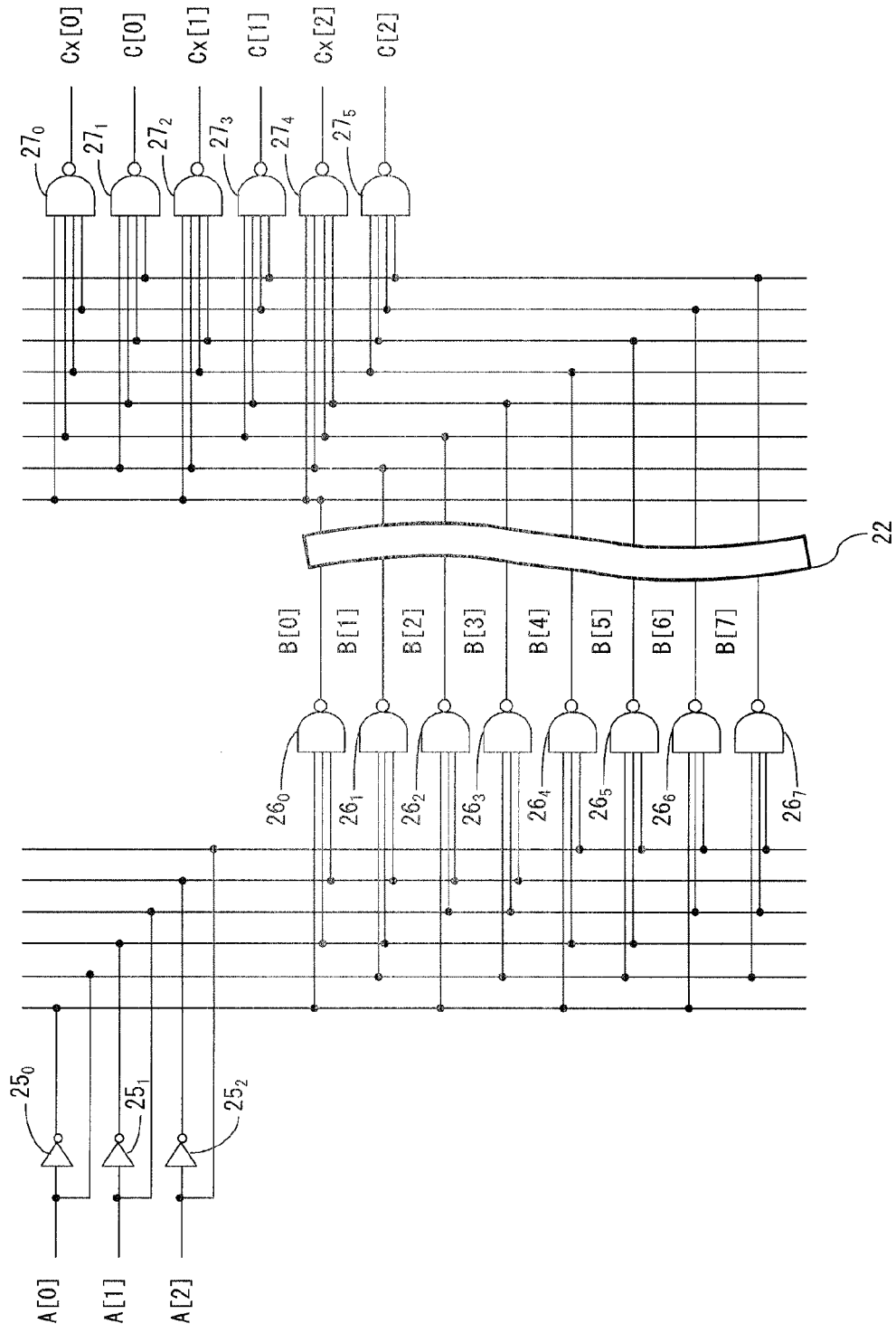
FIG. 8 is a circuit diagram illustrating a configuration of a 3-bit data transfer system according to the first embodiment.

FIG. 8 is a circuit diagram illustrating a configuration of a 3-bit data transfer system according to the first embodiment.

In this figure, an encoder on a transmitting side is configured with three inverters $25_0$ to $25_3$ and eight 3-input NAND gates $26_0$ to $26_7$, whereas a decoder on a receiving side is configured with six 4-input NAND gates $27_0$ to $27_5$ although the encoder and the decoder are not explicitly illustrated.

FIG. 9 is an explanatory view of a relationship between input and output signals of each of the eight 3-input NAND gates $26_0$ to $26_7$ on the encoder side. Also in FIG. 8, the inverted signals Ax[0], Ax[1] and Ax[2] of the input signals are output respectively from the three inverters $25_0$ to $25_3$, and provided to the eight 3-input NAND gates $26_0$ to $26_7$ when needed.

The first row of FIG. 9 represents a relationship between input and output signals of the NAND gate $26_0$. All of the three input signals are inverted signals of data to be transferred to the receiving side, and an output signal is B[0].

The second to the eighth rows in FIG. 9 respectively represent a relationship between input and output signals of the NAND gates $26_1$ to $26_7$. Based on such relationships, one of eight signals B[0] to B[7] on the long-distance wires 22 is "0" and the seven other signals are "1" respectively for data corresponding to decimal numbers of 0 to 7 in a similar manner as in the case of 2 bits described with reference to FIG. 6. If the value of the data to be transferred changes, the above described value of "0" changes to "1", and one of the values of the seven other signals, all of which are "1", changes to "0".

FIG. 10 illustrates a relationship between input and output signals of each of the six 4-input NAND gates $27_1$ to $27_5$ on the decoder side illustrated in FIG. 8. In this figure, the first row represents a relationship between input and output signals of the NAND gate $27_0$ that outputs an inverted signal Cx[0] of C[0]. The second to the sixth rows respectively represent a relationship between input and output signals of the NAND gates $27_1$ to $27_5$.

Figure 11:
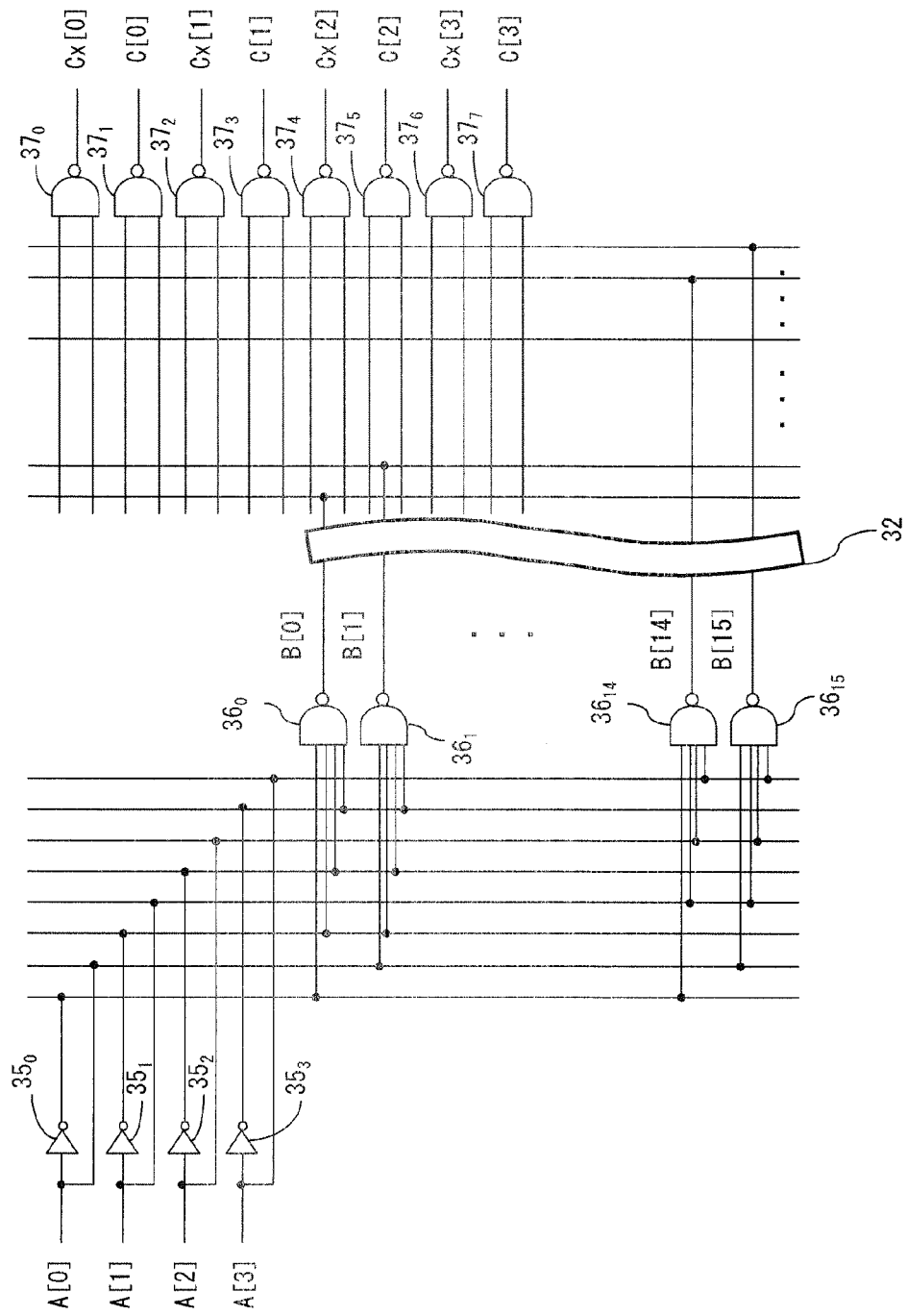
FIG. 11 is a circuit diagram illustrating a configuration of a 4-bit data transfer system according to the first embodiment.

FIG. 11 is a circuit diagram illustrating a configuration of a 4-bit data transfer system according to the first embodiment. In this figure, an encoder on a transmitting side is configured with four inverters $35_0$ to $35_3$ and sixteen 4-input NAND gates $36_0$ to $36_{15}$, whereas a decoder on a receiving side is configured with eight 8-input NAND gates $37_0$ to $37_7$ although the encoder and the decoder are not explicitly illustrated.

FIG. 12 illustrates a relationship between input and output signals of each of the sixteen 4-input NAND gates $36_0$ to $36_{15}$ on the encoder side illustrated in FIG. 11. Also within this encoder, inverted signals of 4-bit data A[0] to A[3] are output by the four inverters $35_0$ to $35_3$, and provided to the NAND gates $36_0$ to $36_{15}$ when needed.

The first row of FIG. 12 represents a relationship between input and output signals of the 4-input NAND gate $36_0$. All of the inverted signals of the 4-bit data are provided as input signals. The second to the sixteenth rows respectively represent a relationship between input and output signals of the 4-input NAND gates $36_1$ to $36_{15}$.

FIG. 13 illustrates a relationship between input and output signals of each of the eight 8-input NAND gates $37_0$ to $37_7$ on the receiving side illustrated in FIG. 11. For simplicity of illustration, FIG. 11 does not illustrate the connections of the input signals to the 8-input NAND gates $37_0$ to $37_7$. By respectively providing the input signals represented by the first to the eighth rows of FIG. 13 to the NAND gates $37_0$ to $37_7$, the similar data C[0] to C[3] as the transfer data A[0] to A[3] from the transmitting side, and their inverted data Cx[0] to Cx[3] are output.

FIG. 14 is a circuit diagram illustrating a configuration of the data transfer system according to the second embodiment. In the second embodiment, it is assumed that a pulse signal is provided as a transmission signal, and the similar pulse signal as that to be transmitted is output on the receiving side. It is further assumed that a signal complementary (differential) to a signal of each bit of transfer data is also input to the encoder 50 on the transmitting side. For example, four signals are assumed to be input for 2-bit transfer data.

In FIG. 14, an encoder 50 illustrated in FIG. 14 does not include two inverters unlike the encoder 10 illustrated in FIG. 3. However, since inverted signals are provided as input signals, a relationship between input and output signals of each of the four 2-input NAND gates $56_0$ to $56_3$ is substantially the similar to that between input and output signal of each of the four NAND gates $16_0$ to $16_3$ illustrated in FIG. 3. Moreover, a relationship between input and output signals of each of the four NAND gates $57_0$ to $57_3$ within the decoder 51 on the receiving side is substantially the similar to that between input and output signal of each of the NAND gates $17_0$ to $17_3$ illustrated in FIG. 3. A relationship between a transmission pulse and a reception pulse, and the like in FIG. 14 will be described next with reference to FIG. 15.

FIG. 15 illustrates a truth table in the second embodiment illustrated in FIG. 14. In this figure, it is assumed that a positive pulse P is provided to two signal lines among four input signal lines to the encoder 50 illustrated in FIG. 14, and the potentials of the two other signal lines remain "0", namely, "L" with respect to transmission data of decimal numbers 0 to 3.

A negative pulse NP is generated in one of the signal lines among the long-distance wires 52 for the signals B[0] to B[3] in response to such input pulses to the encoder 50, and the potentials of the three other signal lines result in "1", namely, "H" with respect to the transmission data of 0 to 3. Here, the negative pulse NP is a pulse having a potential that changes from "1" to "0", namely, "H" to "L" for a duration equivalent to the pulse width of the positive pulse P.

In FIG. 14, the positive pulses are provided to the signal lines corresponding to A[1] and Ax[0] among the four input signal lines to the encoder 50. Accordingly, for example, since Ax[1] among the two inputs to the NAND gate $56_0$ remains "0", the value of the output B[0] remains "1" even if the positive pulse is provided as Ax[0] to the other input. Also the values of B[1] and B[3] as the outputs of the NAND gates $56_1$ and $56_3$ remain "1" similarly. In the meantime, the positive pulses are simultaneously provided to the NAND gate $56_2$ as two inputs. As a result, a negative pulse is generated in the output signal B[2].

In the decoder 51 on the receiving side, the signal B[2], namely, the negative pulse is provided to one of the inputs of the NAND gates $57_0$ and $57_3$ that respectively output the signals Cx[0] and C[1]. Therefore, positive pulses are output from these NAND gates, and both of the values of the signals C[0] and Cx[1] result in "0".

FIG. 16 is an explanatory view of a power consumption reduction effect in the second embodiment. With the conventional technology, either of the values A[0] and Ax[0] corresponding to one bit changes with the transmission of pulses if it is assumed that a non-inverted signal and its complementary signal are transmitted to the receiving side unchanged as in FIG. 14. If power consumption required for one bit is assumed to be "1", power consumption required for two bits is twice the power consumption required for one bit, and power consumption required for n bits is n times. The potentials of, for example, two signal lines for 2 bits, or three signal lines for 3 bits change with pulse inputs.

In contrast, according to embodiment, a negative pulse is generated in one among the long-distance wires B[0] to B[3] according to the value of data to be transferred as described with reference to FIG. 15 even when data of each bit changes, and power consumption for one wire is required when the potential of the negative pulse changes. Even if the number of bits of data increases, a negative pulse is generated in one long-distance line in a similar manner as in the first embodiment. Therefore, power consumption remains "1", and the power consumption reduction effect increases compared with the conventional technology.

Figure 17:
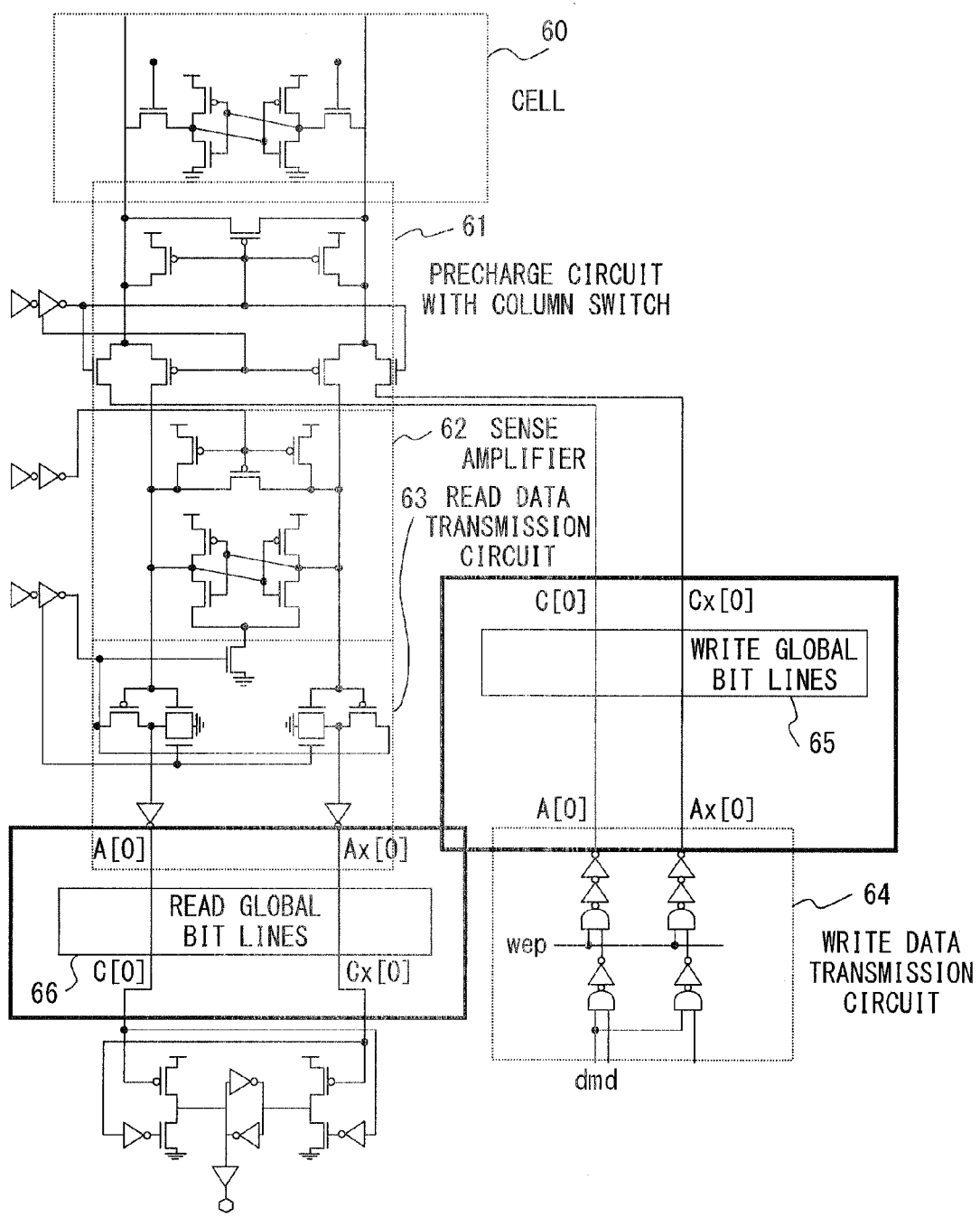
FIG. 17 is a circuit diagram illustrating a data read/write circuit of an SRAM, which corresponds to a third embodiment.

A third embodiment is described next. The third embodiment is implemented by applying the data transfer system according to the second embodiment to a data read/write from/to a static random access memory (SRAM). FIG. 17 is a circuit diagram of such a data read/write circuit for an SRAM. The data read/write circuit illustrated in this figure includes write global bit lines 65 and read global bit lines 66 in addition to a cell 60, a precharge circuit with a column switch 61, a sense amplifier 62, a read data transmission circuit 63 and a write data transmission circuit 64. The write global bit lines 65 are signal lines for transmitting write data from the write data transmission circuit 64 to each of blocks into which a RAM is partitioned, whereas the read global bit lines 66 are signal lines for externally transmitting data read from each of the blocks by the read data transmission circuit 63.

Figure 18:
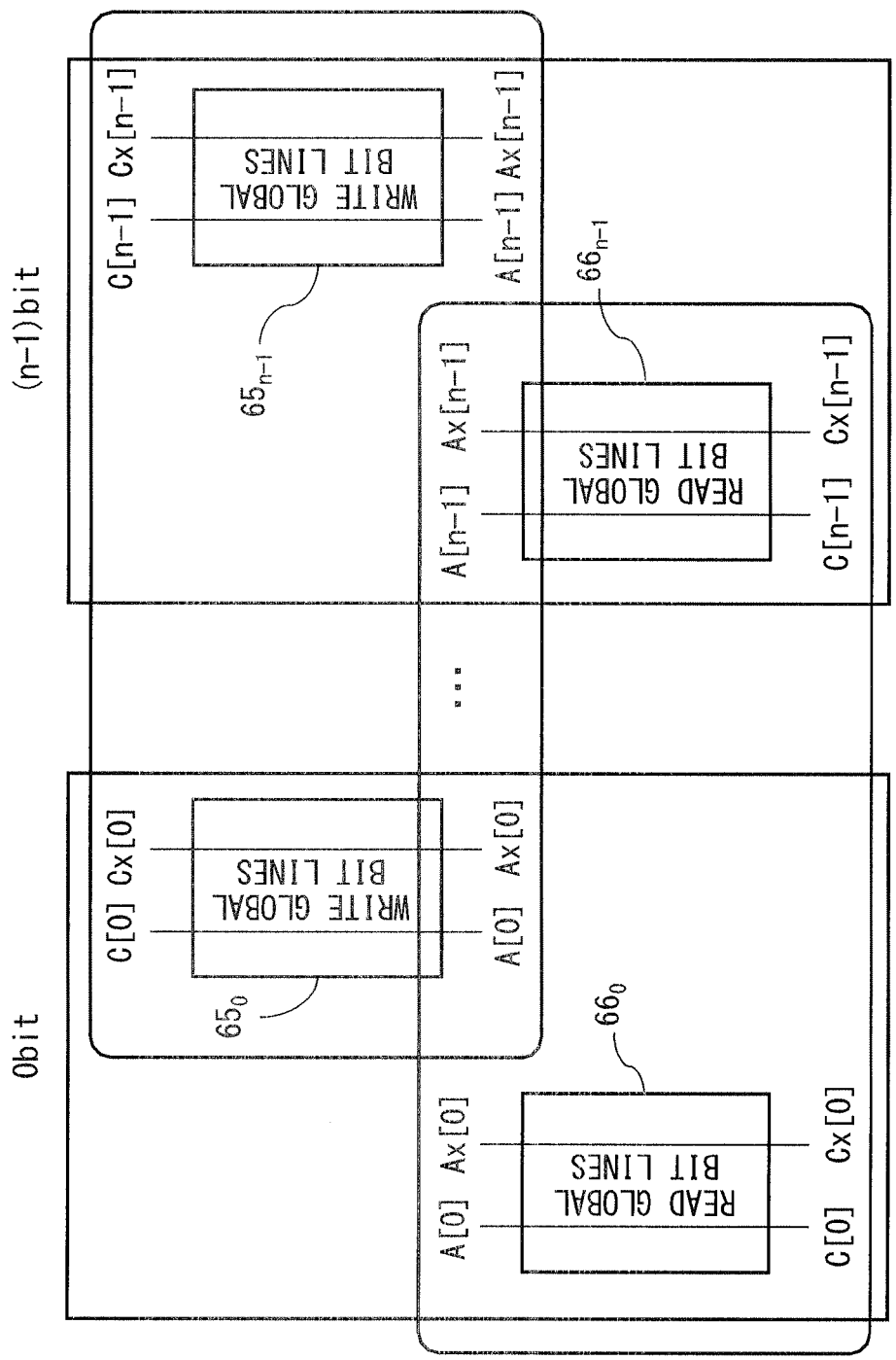
FIG. 18 is an explanatory view of global bit lines in an SRAM of a plurality of bits.

FIG. 18 is an explanatory view of write global bit lines and read global bit lines in a read/write circuit for an SRAM of a plurality of bits implemented by applying the SRAM of one bit described with reference to FIG. 17. This figure illustrates the read/write circuit in the case where the number of bits is n. Namely, the read/write circuit includes write global bit lines $65_0$ to $65_{n-1}$ respectively for bits 0 to (n−1), and read global bit lines $66_0$ to $66_{n-1}$.

According to the third embodiment, power consumption required for a data read and/or a data write may be significantly reduced by using the long-distance wires 52 illustrated in FIG. 14 as a replacement for two signal lines respectively used as write global bit lines and/or read global bit lines for the SRAM of a plurality of bits as described with reference to FIG. 18.

In the third embodiment, the number of long-distance wires required as a replacement for the two write and read global bit lines for each bit of FIG. 18 increases, and an area required for the wires therefore increases. Generally, however, the area of a RAM is determined by the size of a cell, and the size of a RAM does not significantly increase in many cases even if the number of wires is increased. Accordingly, by adopting the third embodiment, an SRAM that produces a very high power consumption reduction effect may be provided.

As described above, according to the embodiments, data on n signal lines are transferred between a transmitting side and a receiving side, and $2^n$ data transfer signal lines are provided between the transmitting side and the receiving side. For example, if 3-bit data is transferred, eight data transfer signal lines are provided. Moreover, the transmitting side has an encoder for respectively outputting a signal of a low potential (L) to one signal line corresponding to data and a signal of a high potential (H) to all the other signal lines among the $2^n$ data transfer signal lines in response to an input of the data provided to the n signal lines, whereas the data receiving side has a decoder for outputting the similar data as the data provided to the n signal lines on the transmitting side to n signal lines in response to signal inputs from the encoder.

Additionally, the data transfer system transfers pulse signals on 2n signal lines in pairs, which correspond to signal lines of n pairs, and includes $2^n$ data transfer signal lines between the transmitting side and the receiving side. In this data transfer system, the data transmitting side has an encoder for outputting a pulse having a potential that changes from high (H) to low (L) according to the pulse width of a positive pulse to one data transfer signal line corresponding to signal lines to which the positive pulse is provided among the $2^n$ data transfer signal lines when the positive pulse is provided to either of the two complementary signal lines of each of the n pairs, whereas the data receiving side has a decoder for outputting a positive pulse to signal lines corresponding to the signal lines to which the positive pulse is provided on the transmitting side among 2n output signal lines in response to the transmission of signals output from the encoder.

The above description refers to the practical example of applying embodiment to a data read/write circuit for an SRAM. However, the scope of applying the present invention is not limited to this example, and may be naturally applied to various types of fields including wiring on a substrate.

According to any one of aforementioned embodiments, power consumption in an electronic device may be reduces by suppressing power consumption required for a data transfer even if the number of bits of data to be transferred, namely, the bus width of data increases.

According to any one of aforementioned embodiments, a data transfer system includes $2^n$ data transfer signal lines are provided between a transmitting side having n transmission signal lines and a receiving side having n reception signal lines, and n-bit transmission data is transferred by the data transfer signal lines.

The data transfer system according to any one of aforementioned embodiments also may includes $2^n$ data transfer signal lines are provided between a transmitting side for transmitting pulse signals on 2n signal lines, which correspond to signals of n pairs, and a receiving side for receiving the pulse signals.

According to any one of aforementioned embodiments, a signal of a low potential (L) is output to one signal line and a signal of a high potential (H) is output to the other signal lines among the $2^n$ data transfer signal lines between the data transmitting side and receiving side. Power is consumed when the potential of one signal line having a low potential changes to a high potential, and when the potential of one signal line having a high potential changes to a low potential. Namely, the number of signal lines that consume power with a change in a potential is one pair as described above even if the number of bits of data increases. For example, a power reduction effect is high when the number of bits increases.

Also in the data transfer system for transmitting a pulse signal, the number of signal lines that transfer a pulse having a changing potential is one of the $2^n$ data transfer signal lines. Power is consumed when the potential of this pulse changes. Therefore, power consumption may be suppressed even if the number of bits of transfer data increases.

Numbers applying embodiments (first, second or third etc.) do not show priorities of the embodiments. Many variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention, the scope of which is defined in the claims and their equivalents.

What is claimed is:

1. A data transfer system provided between n transmission signal lines on a data transmitting side and n reception signal lines on a data receiving side, the data transfer system comprising:

$2^n$ data transfer signal lines to transfer a transfer data;

an encoder to encode n-bit transmission data inputted from the n transmission signal lines on the data transmitting side into the transfer data such that the transfer data represents the n-bit transmission data, by outputting a signal in a first state to one signal line among the $2^n$ data transfer signal lines and outputting a signal in a second state to the other signal lines among the $2^n$ data transfer signal lines; and a decoder to decode the transfer data into the n-bit transmission data on the data receiving side, wherein:

the decoder comprises 2n NAND gates;

n NAND gates among a total of 2n NAND gates output the similar data to the n reception signal lines on the data receiving side; and the remaining n NAND gates are connected to additional n reception signal lines and output, to the additional n reception signal lines, data which is an inversion of the data output to the n reception signal lines.

2. The data transfer system according to claim 1, wherein a value of the n is equal to or larger than 4.

3. The data transfer system according to claim 1, wherein the encoder comprises n inverters and $2^n$ NAND gates.

4. The data transfer system according to claim 1, wherein the decoder outputs the similar data as data provided to the n transmission signal lines on the data transmitting side to the n reception signal lines in response to inputs of signals output from the encoder to the $2^n$ data transfer signal lines.

* * * * *